US011215458B2

(12) United States Patent
Lucas et al.

(10) Patent No.: US 11,215,458 B2
(45) Date of Patent: Jan. 4, 2022

(54) METHOD OF DETERMINING AN OPTIMAL ROUTE

(71) Applicant: Maritech Development Limited, London (GB)

(72) Inventors: Craig Lucas, London (GB); Richard White, Brighton (GB); Eliad Perpinyal, London (GB); Roy Michael Cockram, London (GB)

(73) Assignee: MARITECH DEVELOPMENT LIMITED, London (GB)

( * ) Notice: Subject to any disclaimer, the term of this patent is extended or adjusted under 35 U.S.C. 154(b) by 74 days.

(21) Appl. No.: 16/213,977

(22) Filed: Dec. 7, 2018

(65) Prior Publication Data
US 2019/0178649 A1 Jun. 13, 2019

(30) Foreign Application Priority Data

Dec. 7, 2017 (GB) ..................................... 1720412

(51) Int. Cl.
| | |
|---|---|
| *G01C 21/20* | (2006.01) |
| *G08G 3/00* | (2006.01) |
| *G01C 21/00* | (2006.01) |
| *G01C 21/14* | (2006.01) |
| *G08G 3/02* | (2006.01) |

(52) U.S. Cl.
CPC ......... *G01C 21/203* (2013.01); *G01C 21/005* (2013.01); *G01C 21/14* (2013.01); *G08G 3/00* (2013.01); *G08G 3/02* (2013.01)

(58) Field of Classification Search
CPC .................................................. G01C 21/203
See application file for complete search history.

(56) References Cited

U.S. PATENT DOCUMENTS

| | | | |
|---|---|---|---|
| 2013/0325284 A1* | 12/2013 | Sato ..................... | G08G 1/0104 701/96 |
| 2016/0349063 A1* | 12/2016 | Maurer .................. | H04L 67/42 |
| 2016/0358480 A1 | 12/2016 | Kang et al. | |
| 2018/0274929 A1* | 9/2018 | Mase ................... | G08G 5/0026 |
| 2020/0018844 A1* | 1/2020 | Fridman ................. | G08G 3/00 |

FOREIGN PATENT DOCUMENTS

| | | |
|---|---|---|
| WO | 2011027037 A1 | 3/2011 |
| WO | 2011057323 A1 | 5/2011 |
| WO | 2017175327 A1 | 10/2017 |

OTHER PUBLICATIONS

WO2011057323 machine translation (May 2011).*
Search and Examination Report, dated Jun. 1, 2018.

* cited by examiner

*Primary Examiner* — Anne Marie Antonucci
*Assistant Examiner* — Abdalla A Khaled
(74) *Attorney, Agent, or Firm* — William T. Hoyer McCarthy; Jason Novak; Haynes and Boone LLP

(57) ABSTRACT

Disclosed herein is a method of determining an optimal route for a vessel based on vessel traffic data. The method comprises receiving vessel traffic data relating to the movement of each of a plurality of vessels in a geographical region and defining sub-regions within the geographical region in which the vessel traffic data has similar characteristics. The method also comprises determining an optimal route for a vessel between two geographical points using a representation of the geographical region. The representation comprises nodes, and each node is associated with a respective defined sub-region.

13 Claims, 6 Drawing Sheets

METHOD OF DETERMINING AN OPTIMAL ROUTE

CROSS REFERENCE TO RELATED APPLICATIONS

This patent application claims priority to GB Application No. 1720412.4, filed Dec. 7, 2017, the contents of which hereby incorporated by reference in its entirety for all purposes.

BACKGROUND OF THE INVENTION

This disclosure relates to a method of determining an optimal route, and in particular to determining an optimal route which may be traversed by a vessel.

Satellite navigation systems are widely used, in particular in the auto-motive field. A driver may enter a destination into his or her 'satnav' system, which is then able to determine an optimal route between the driver's current location and a desired destination. It is advantageous not only to calculate the most efficient possible route, but also to calculate the route and respond to the driver's query as quickly as possible.

However, a number of difficulties present themselves when attempting to determine an optimal route for a vessel. The skilled person will appreciate that a graph having nodes connected by edges, each edge having an associated weight or cost, is a pre-requisite for most shortest-route calculation algorithms. While roads and junctions provide structure which may form the basis of such a graph when determining an optimal route for a car, such structure is not available when determining an optimal route for a vessel.

The present invention seeks to address this and other disadvantages encountered in the prior art by providing a method of generating an optimal route for a vessel based on vessel traffic data, as well as a graph suitable for use in such a method.

SUMMARY OF THE INVENTION

According to an aspect, there is provided a method of determining an optimal route for a vessel based on vessel traffic data, the method comprising receiving vessel traffic data relating to the movement of each of a plurality of vessels in a geographical region; defining sub-regions within the geographical region in which the vessel traffic data has similar characteristics; and determining an optimal route for a vessel between two geographical points using a representation of the geographical region, the representation comprising nodes, each node being associated with a respective defined sub-region.

The method may further comprise producing the representation of the geographical region.

The method may further comprise assigning nodes to the representation, each node being associated with a respective defined sub-region.

The method may further comprise joining neighbouring nodes in the representation with edges based on vessel journeys identified using the vessel traffic data.

The method may further comprise joining a first and a second node with a plurality of edges, each respective edge of the plurality of edges being created using different respective vessel journeys identified using the vessel traffic data, the different respective vessel journeys being associated with vessels having different characteristics.

The nodes may be connected by edges each having at least one associated weight, the weights being based on characteristics of vessel journeys identified using the vessel traffic data.

The at least one weight may be representative of at least one of the average time taken to travel along the edge and the average amount of fuel required to travel along the edge; the average amount of monetary cost required to travel along the edge; and the number of journeys identified along the edge in the vessel traffic data.

The weights may be blended weights, wherein each blended weight is based on at least two respective types of vessel journey identified in the vessel traffic data, the types of vessel journey being associated with different vessel characteristics.

The optimal route may be determined using a shortest-path routing algorithm.

Defining sub-regions within the geographical region in which the vessel traffic data has similar characteristics may comprises identifying geographical regions in which variation within the vessel traffic data is below a variation threshold value.

The method may further comprise iteratively considering each of a number of proposed sub-regions and, for each proposed sub-region, determining whether the variation of vessel traffic data associated with the proposed sub-region is above a threshold variation value and, if it is, splitting the proposed sub-region into a plurality of smaller proposed sub-regions.

The sub-regions in which the vessel traffic data has similar characteristics may be defined as those proposed sub-regions in which variation of vessel traffic data is not above the threshold variation value.

The vessel traffic data may comprise data relating to the speeds of each of the plurality of vessels.

According to an aspect, there is provided a method of producing a representation of a geographical region for use in determining, based on vessel traffic data, an optimal route for a vessel between two geographical points. The method comprises receiving vessel traffic data relating to the movement of each of a plurality of vessels in a geographical region; defining sub-regions within the geographical region in which the vessel traffic data has similar characteristics; and producing the representation of the geographical region, the representation comprising nodes, each node being associated with a respective defined sub-region.

The method of producing a representation may further comprise any of the features discussed above or elsewhere herein in relation to the method of determining an optimal route.

According to an aspect, there is provided a computer readable medium comprising computer-executable instructions which, when executed by a processor, cause the processor to perform the disclosed methods.

BRIEF DESCRIPTION OF THE DRAWINGS

Specific embodiments are now described, by way of example only, with reference to the drawings, in which.

DETAILED DESCRIPTION OF THE INVENTION

Figure 1:
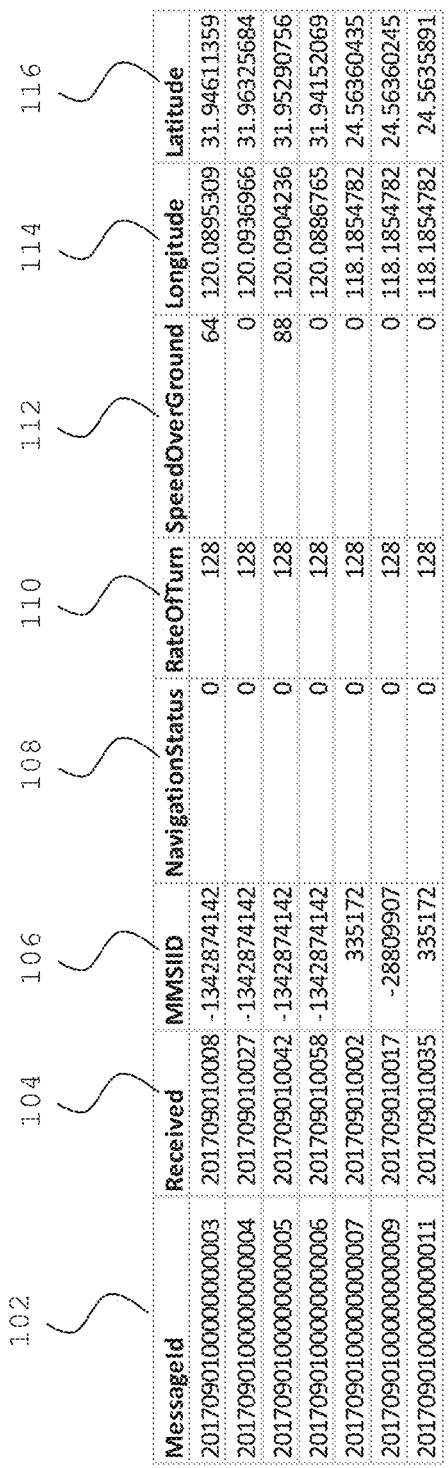
FIG. 1 depicts a database containing vessel traffic data.

A number of shortest path routing algorithms are available, which can each be used to determine am optimal path between two geographical points. These algorithms typically treat the two geographical points as nodes on a graph. The graph may be formed of a number of nodes, i.e. other geographical points, which are joined by edges. Each edge has an associated 'cost' or 'weight'. For example, when calculating driving directions, junctions may form the nodes on the graph. Roads which connect these junctions may form the edges. Each road has an associated weight, which may be, for example, the time typically taken to drive along the road between the two junctions. An algorithm can then be employed to determine the path between the given nodes which minimises the accumulated weight or cost.

Determining an optimal route using these shortest path routing algorithms typically involves two main stages: a pre-processing stage, in which the graph is produced, and a calculation stage, in which the graph is queried, i.e. in which the algorithm determines the route between two given nodes on the graph which minimises the cost or weight. While the algorithms are typically named 'shortest-path' routing algorithms, these algorithms actually determine the route between nodes on a graph which minimises the cost or weight of the edges which form the route.

The pre-processing stage in particular is difficult when attempting to produce a graph which can be used to determine an optimal route for a vessel, e.g. a boat or ship. Unlike with road traffic, it is not possible to use road junctions and therefore the question of which geographical points should be represented by nodes on the graph is made significantly more difficult. Ships can travel in any given direction and at any chosen speed across a navigable body of water and therefore it has also proven difficult to decide how the nodes should be connected, and what weight should be assigned to the connections. The approach disclosed herein uses data obtained from real vessels, and in particular data which describes real shipping traffic, in order to produce a graph which is suitable for use when determining an optimal route for a vessel.

Each vessel above a certain gross tonnage is required to be fitted with a tracking system, which broadcasts information relating to the identity and characteristics of the particular vessel as well as data relating to its current location and movement. Such data may include location, orientation, course, and the speed of the vessel. The tracking system is called the automatic identification system (AIS). Typically, AIS messages are automatically broadcast at regular time intervals via a transmitter on the ship. The time interval is typically on the order of a few seconds. The broadcast AIS messages allow the location and speed of vessels, among other factors, to be tracked and monitored.

Information typically broadcast in an AIS message includes the MMSI number (i.e. a unique number which identifies the vessel); navigation status (e.g. at anchor, under way using engine, etc.); rate of turn (e.g. right or left, 0 to 720 degrees per minute); speed over ground (typically given in knots); location data (e.g. longitude and latitude); position accuracy; course over ground (relative to true north); true heading; data relating to fuel usage (e.g. current amount of fuel, current fuel usage rate); and a time stamp. The AIS message contains the location at which the message was broadcast. The location is stored using a geographic co-ordinate system. Typically, a latitude and a longitude is associated with each MS message.

Data from various AIS messages may be stored in a database. In a preferred embodiment, a further condensed database is produced containing vessel traffic data to be used in the methods described herein. Such a condensed database may take the form shown in FIG. 1.

The database shown in FIG. 1 contains information taken from AIS messages. Each row is associated with a single AIS message. The database contains information relating to the identity of the AIS message, as shown at 102. The column is titled MessageId. The database also stores the AIS message timestamp at 104, i.e. in the column titled Received. The database also stores information which allows the ship which broadcast the AIS message to be identified, at 106. This column is titled MMSIID. It will be appreciated that the database contains a plurality of messages which were broadcast by the same vessel but at different time. The database also stores information relating to the navigation status of the vessel at 108. The column is titled Navigationstatus. The Navigationstatus values of an AIS messages may take one of several values, including 0 (under way using engine); 1 (at anchor) 2 (not under command) etc. The database also contains other information relating to the movement of the vessel, including the rate of turn, 110, and the speed over ground, 112. The database also contains location information which gives the location of the vessel at the time the AIS message was broadcast. In the database shown in FIG. 1, the location information takes the form of a longitude value, 114, and a latitude value, 116.

Figure 2:
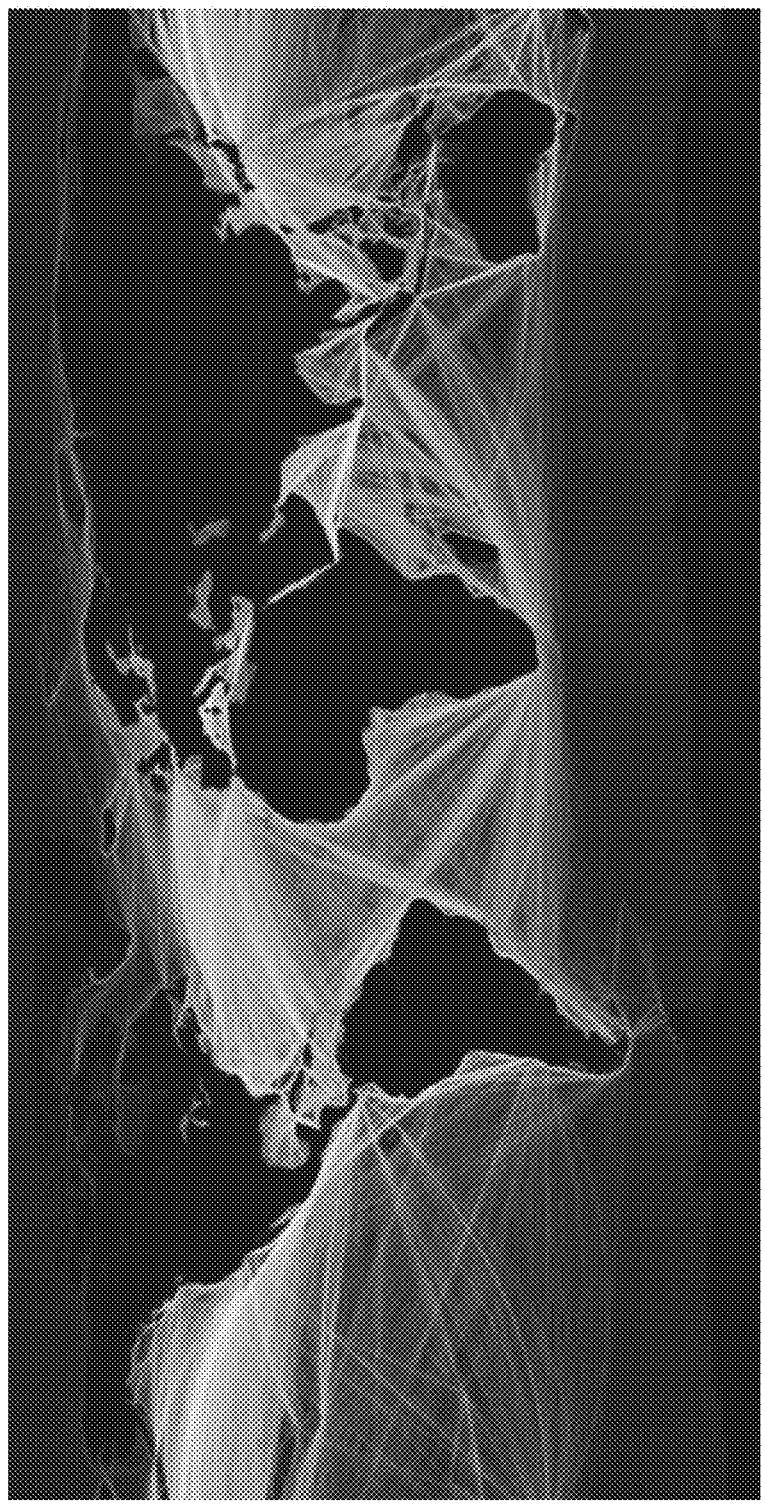
FIG. 2 depicts shipping routes which have been identified using vessel traffic data.

FIG. 2 shows a map of the world. Overlaid on the map are lines which depict shipping routes identified by analysing MS data. As will be appreciated, a shipping route can be plotted by joining the locations at which a particular vessel emitted an AIS message.

Figure 3:
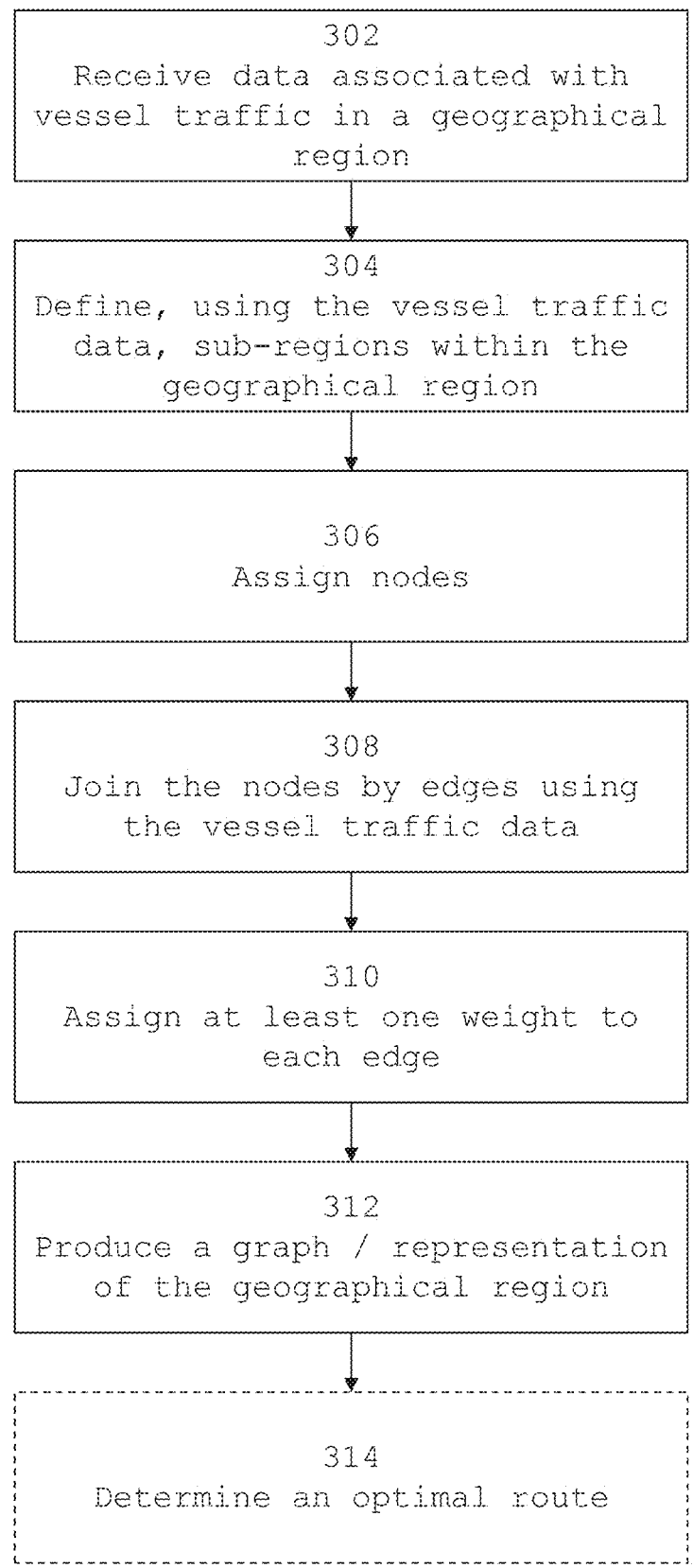
FIG. 3 is a flowchart depicting a suitable method for producing a graph of a geographical region and/or of determining an optimal route for a vessel.

FIG. 3 shows a flowchart of a method according to the present disclosure. At 302, data associated with vessel traffic in a geographical region is received. The vessel traffic data contains information relating to the movement of a plurality of vessels. The plurality of vessels may include a range of different types of vessels, for example tankers, cruise ships, fishing vessels, cargo ships, etc. In a preferred embodiment, the vessel traffic data is AIS data broadcast from a number of vessels over a particular time period. The AIS data may be a number of AIS messages broadcast by a plurality of vessels. The time period may be, for example, two weeks or a month. The AIS messages are broadcast by each vessel, received by a receiver, and are stored and collated in, and hence are received at, a database.

In another embodiment, the data is not taken over a single time period. Instead, data taken over a number of time periods is collated. For example, historical data associated with a particular vessel may be combined with data taken over a more recent time period associated with another vessel.

At 304, sub-regions within the geographical region are defined using the vessel traffic data. The sub-regions are areas of the geographical region in which the vessel traffic data exhibits sufficiently similar characteristics. It will be appreciated that altering the size of a proposed sub-region, i.e. adjusting its boundary within the geographical region, changes the number of AIS messages which were broadcast from within the boundary. In other words, changing the size of a proposed sub-region changes the amount of vessel traffic data associated with the proposed sub-region. The degree of variation within the vessel traffic data associated with a possible or proposed sub-region, for example the degree of variation within the vessel speeds, may be used to determine whether the proposed sub-region should be defined as a sub-region. In other words, a degree of variation within the vessel traffic data is used to define the sub-regions.

In some implementations, sub-regions which share suitably similar characteristics are identified, and defined, by looking at the amount of variation present in the data associated with the sub-region. Suitable algorithms can take either a divisive or an agglomerative approach. In other words, suitably sized sub-regions can be found starting from either large sub-regions which become iteratively smaller, or starting from small sub-regions which become iteratively larger. Both processes stop iteratively altering the size of a proposed sub-region when a size of sub-region has been found for which the vessel traffic data associated with the sub-region displays a suitable level of variation.

Taking a divisive approach, it is possible to start with a small number of large proposed sub-regions. The initially proposed sub-regions may be arbitrarily sized and should cover the entire geographical region of interest. For example, in an implementation in which the geographical region of interest is the entire globe, it has been found that an algorithm which starts with two proposed sub-regions, representing the eastern and western hemisphere, produces good results.

Figure 5:
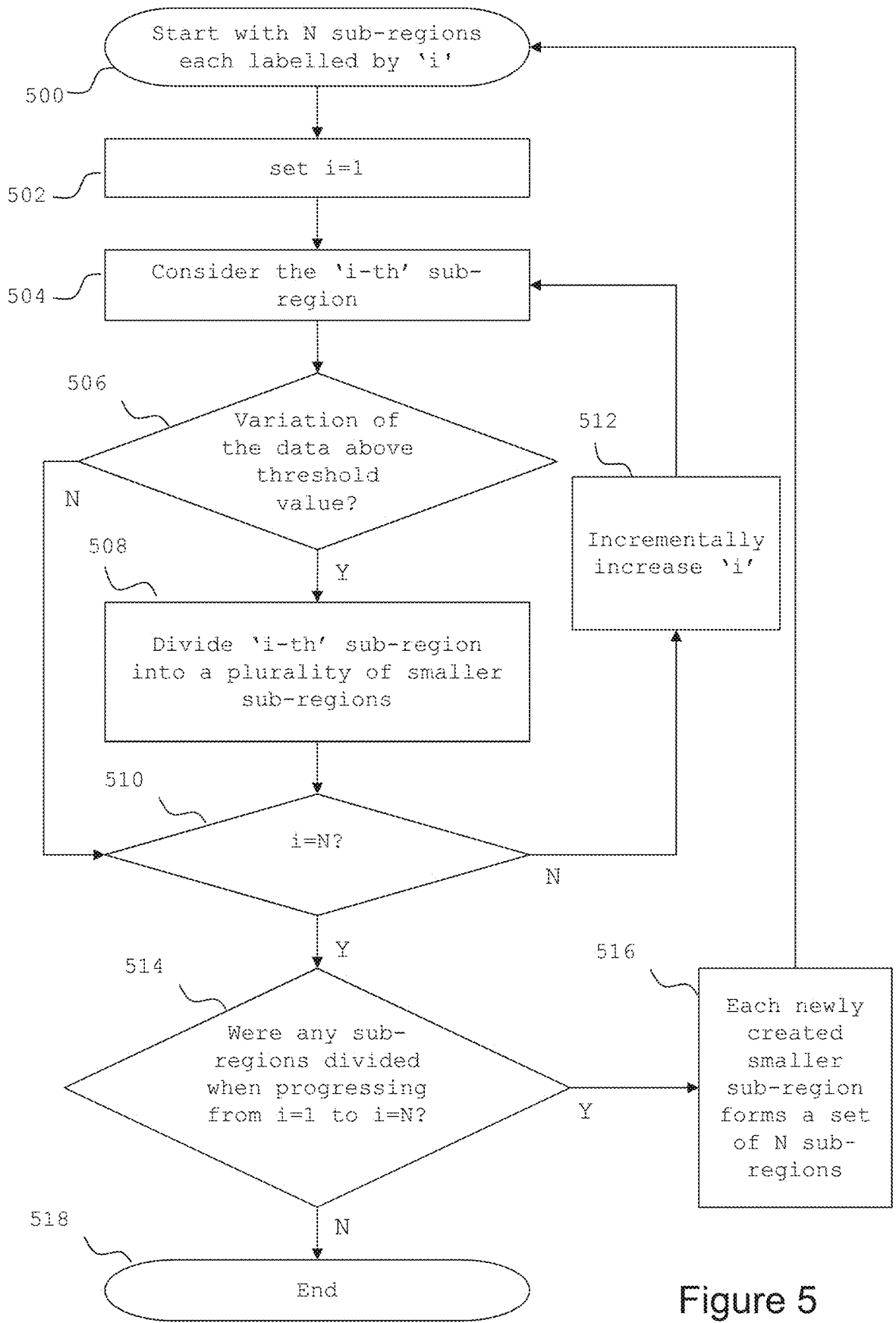
FIG. 5 is a flowchart depicting a suitable method for dividing a geographical region into sub-regions.

The vessel traffic data of each proposed sub-region is then analysed. In some implementations, the speed value of each AIS message which was broadcast from the proposed sub-region is considered. In other words, considering a particular proposed sub-region, the vessel speeds associated with the AIS messages which were broadcast from locations within the boundary of the particular proposed sub-region are identified within the dataset. The variation in the vessel speeds associated with these AIS messages is then determined and considered. There are different metrics which may be used to quantify the variance of a set of data points, for example the variance or the standard deviation. If the variation of vessel speed values within a particular proposed sub-region is above a threshold variation value, then the vessel speeds are deemed to not share similar characteristics. In other words, the vessel traffic data associated with the proposed sub-region is deemed to be not sufficiently similar. The proposed sub-region is then divided into a plurality of smaller sub-regions, which are in turn also considered using the same method as the 'parent' sub-region to determine if the variation of data within each of the smaller sub-regions meets the threshold. If the variation is above a threshold in any proposed sub-region, the sub-region is divided, or 'split', into smaller sub-regions. If the variation in a particular proposed sub-region is not above a threshold variation value, then the particular proposed sub-region is not split. In this way, sub-regions within the geographical region in which vessel speed values are similar to one another are defined. A flowchart showing a suitable method for defining such sub-regions is shown in FIG. 5, and is described in further detail below.

Once suitable sub-regions of the geographical region have been defined using the vessel traffic data, it is possible to begin to produce a graph which represents the geographical region.

At 306, nodes are assigned to a representation of the geographical region. In other words, a graph is created having nodes which are associated with the defined sub-regions. The nodes are tagged with information associated with the location of the defined geographical sub-regions. The graph is assigned a respective node for each defined sub-region. The nodes are associated with the centre of each defined sub-region. A graph/representation of the geographical region is formed, with the nodes being associated with the centre of the sub-regions. In implementations in which each sub-region is a square or a rectangle, the centre of the sub-region may be simply defined as the point at which the diagonal lines which join the corners of the rectangle meet. This centre-point can be simply calculated using the co-ordinates of the rectangle vertices and the calculation will not be discussed in further detail. Alternatively, the centre of the sub-region may be defined as the centroid of each of the AIS locations within the sub-region.

More generally, this step can be described as producing a graph having nodes, each of which is a representation of, in other words which is associated with, the centre of a defined sub-region. Each node is associated with and tagged with a location, for example a latitude value and a longitude value.

At 308, the nodes are joined with edges using the vessel traffic data, e.g. the AIS data. Using the AIS data, real vessel journeys between the nodes are identified, and these journeys are used to determine which nodes should be joined by an edge.

Vessels are identifiable in the database using the vessel's MMSI number or other identification data broadcast by the vessel. It is therefore possible to identify a particular journey between two adjacent sub-regions using the AIS data. A group of AIS messages associated with a particular vessel's journey between two defined sub-regions is identified and analysed. In other words, the AIS data can be used to identify groups of AIS messages which are associated with a real vessel's travel between sub-regions. When a journey between two adjacent, or neighbouring, sub-regions is identified, the nodes on the graph are linked by an edge.

In an example, a vessel moves between the port of Southampton, United Kingdom and the port of New York, United States. During this voyage, the vessel regularly broadcasts MS messages, which are received by a receiver and are stored in a database. The AIS messages associated with the vessel's journey between Southampton and New York can be readily identified using the emitted AIS messages. On its journey, the vessel passes through geographical areas which are later associated with a first and a second defined sub-region. The first and the second sub-region are adjacent to one another and have centre-points associated with a first and a second node respectively. When analysis of the vessel traffic data shows that the vessel has passed through the two adjacent sub-regions, the respective nodes of the two sub-regions are joined by an edge on the graph. In other words, the edge is created between the two nodes. The analysis is continued across all journeys represented in the dataset. When the analysis identifies a journey which passes through adjacent sub-regions, the nodes associated with the adjacent sub-regions are linked, or connected, by an edge.

At 310, each edge is assigned at least one weight. A weight may also be referred to as a 'cost'. The weights for the edges are determined based on characteristics of the actual journeys the edges represent. Considering the example detailed above in which a particular vessel passes through a first and a second sub-region and the associated first and second nodes are thus joined by an edge, it is possible to assign a weight to this edge using some or all of the AIS messages broadcast by the particular vessel while it travelled from the first sub-region to the second sub-region.

In a preferred embodiment, all journeys between the first and second sub-region identifiable within the vessel traffic data are identified. A plurality of groups of MS messages are thus identified, each group being associated with a particular vessel's particular journey between the first and second sub-region. Each group of AIS messages is associated with a different journey between the first and second sub-region. It is feasible that the same vessel may have made multiple journeys through the geographical regions associated with the first and second sub-regions over the time period of the dataset, and therefore the identified journeys may include journeys taken by different vessels as well as different journeys taken by the same vessel.

Depending on the vessel traffic data, vessel journeys associated with a variety of vessel types may be identified. The purpose of identifying a plurality of groups of AIS messages, each group being associated with a particular journey identifiable within the data, is that in some embodiments a weight can be calculated for an edge based only on a relevant subset of all the identified journeys along the edge. For example, all the identified journeys may be split into subsets according to vessel characteristics. It is then possible to calculate different weights for each edge based on different respective vessel characteristics. This allows a user to determine an optimal route for his cargo vessel based on vessel traffic data taken from other, similar cargo vessels. This will be discussed in further detail later.

Once groups of AIS messages have been identified, i.e. once different vessel journeys between the first and second sub-region have been identified, an average vessel speed for travel between the two sub-regions is determined. In other words, an average is taken of the speed values associated with each AIS message which was broadcast by a vessel travelling between the first and second sub-region. This gives the average vessel speed for all the journeys which occurred between the first and second sub-region.

The nodes are associated with the centre-points of each sub-region, and therefore the nodes are associated with a known, and precise, geographical location. Therefore, the distance between the first and second node may be calculated. Because the distance between the first and second node is known, once an average vessel speed for all the journeys between the first and second sub-regions has been calculated it is possible to determine a value representative of the average time taken to travel between the two nodes by dividing the internode distance by the average speed of travel between the two nodes.

This process can be carried out for all the edges to determine a value representative of the time taken to travel along each edge. These time values, or values based on these time values, can be used as weights for the edges which link the neighbouring nodes.

Instead of identifying all the vessel journeys between the first and second sub-region, in some implementations only a sub-set of all these journeys is identified and incorporated into subsequent calculations. For example, only a sufficient number of journeys to ensure statistical significance is considered. For example, once one thousand journeys between two sub-regions have been identified, the process may stop identifying journeys since the journeys already identified may be enough to ensure the determined weights are statistically significant. A suitable threshold for the number of journeys required may be determined using known statistical methods or by trial and error.

It will be appreciated that other weights may be assigned to the edges, either instead of, or in addition to, the average time taken to travel between the nodes. In some implementations, edges may be assigned multiple weights. A user may then decide which weight the algorithm should consider when determining the optimal route. In a simple example, weights may be assigned to the nodes based on the distance between the nodes. Such a graph will allow the determination of the shortest route, in terms of geographical distance, between two geographical points.

Weights may be assigned using any type of data present in an AIS message. For example, using the AIS data it is possible to determine the average fuel required in order to travel between the nodes. The fuel required to travel between two nodes, on average, can be calculated using the method outlined above, e.g. by considering the identified AIS messages which are associated with journeys between the two associated sub-regions, determining the amount of fuel used during each identified journey, and taking an average of all these fuel usage values. A graph in which the edges are weighted by fuel usage can be used to determine the route between two geographical points which requires the least amount of fuel to traverse. Using fuel price data, it is also possible to use this average fuel consumption value to assign a weight associated with the monetary cost of travelling along the edge.

It will be appreciated that different types of vessel consume fuel at different rates, and indeed different vessel types use different fuels. This can be addressed by incorporating vessel characteristics into the production of the graph. As will be discussed later, it is possible to divide the identified journeys according to vessel characteristics, e.g. vessel size, and these journeys may be analysed separately. Accordingly, different edges and/or different weights may be incorporated into the graph according to the vessel characteristics identifiable within the data.

Similarly, as it is possible to determine the number of journeys which took place between any two sub-regions within the time period of the data, it is possible to assign a weight based on this number to the edge linking the sub-regions. This weight is representative of how heavy the vessel traffic is between two nodes. If travel between certain nodes is more common or popular, it suggests among other things that travel between the associated geographical areas is safe. The amount of traffic between two nodes can be represented, for example, in number of journeys per unit time. Thus, weights may be assigned to edges based on the vessel traffic between nodes, and the resulting graph may be used to produce safe routes.

The direction of the identified journeys may also be taken into account. For example, journeys between neighbouring sub-regions can be split into those journeys which passed from the first to the second sub-region and those journeys which passed from the second to the first sub-region. These groups of journeys can be analysed separately, leading to two 'directional' weights being assigned to each edge. The relevant weight is then used depending on the direction of a query to the graph.

In some implementations, steps 308 and 310 may be combined. In other words, weights may be assigned to edges as the edges are identified, rather than in separate steps.

At 312, a graph of the geographical region is produced. The graph is produced via the steps defined in 306, 308 and 310. The graph comprises a number of nodes connected by edges, each of the edges having an associated weight. In its simplest form, the graph comprises at least two nodes joined by at least one edge. As discussed above, such a graph is required by most shortest-route plotting algorithms in order to determine an optimal route between two nodes on the graph. Each node is associated with a respective sub-region.

At 314, an optimal route between two geographical points is determined. In other words, the graph produced at 312 is used by an algorithm to determine the most efficient route of traversing the graph, which minimises the accrued weight/cost.

Once the graph has been produced using the vessel traffic data, the final graph may be queried by different entities. In a preferred embodiment, access to the graph is provided via a suitable user interface on a website or web application. The user inputs criteria, including the geographical points between which they would like an optimal route to be determined, and an optimal route is determined using the data inputted by the user. As is discussed elsewhere herein, the user may input data relating to his or her type of vessel and relating to the nature of the route which should be calculated. The calculation of the optimal route may be performed at the server side, e.g. at a web server, or the client side, e.g. the calculation may be performed by the user's web browser.

It will be appreciated by the skilled person that a number of algorithms may be used in order to determine the shortest path/optimal route. A simple example of a suitable algorithm is Dijkstra's algorithm. In a preferred embodiment, contraction hierarchies techniques may be used in order to increase the speed with which a query of the graph may be calculated. In order for these algorithms to be used, the graph may undergo several additional pre-processing steps in order to reduce the calculation speed in response to a user's query. The person skilled in the art will be aware of, and be able to carry out, the requisite pre-processing steps depending on the shortest-route algorithm chosen.

The nature of the determined optimal route can be adjusted by the user, i.e. the person who queries the graph. For example, the user may determine that they would like to see the optimal route between two geographical points in terms of the monetary cost between the two points. In which case, the user inputs this selection via a suitable user interface, and the graph may be adjusted such that monetary cost weights are used. The user can similarly decide to use any of the weights which have been assigned to the edges during the pre-processing stage, or a blend of these weights as discussed below.

Figure 4:
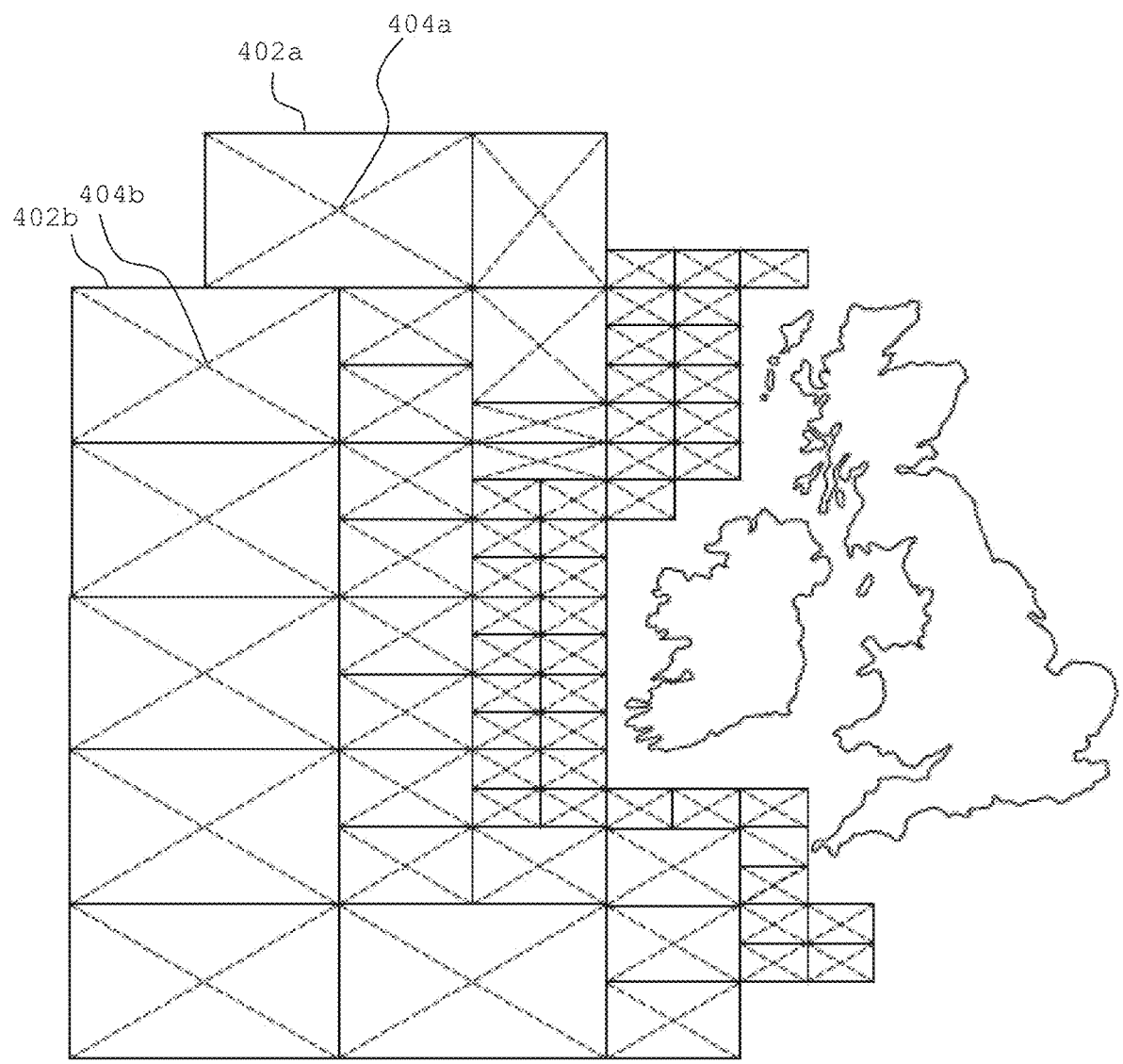
FIG. 4 depicts a geographical region divided into sub-regions.

FIG. 4 depicts a geographical region. The geographical region includes the UK and part of the North Atlantic Ocean. Geographical sub-regions (402a, 402b) have been defined within the geographical region. For increased clarity, not all the sub-regions which would be defined within the geographical area are shown in FIG. 4. Vessel traffic data relating to the movement of a plurality of vessels in the North Atlantic Ocean has been used to define the sub-regions (402a, 402b). The defined sub-regions in FIG. 4 are regions in which the vessel traffic data has similar characteristics. As will be appreciated from FIG. 4, the size of the sub-regions may vary. The boundaries, and hence the size, of the sub-regions (402a, 402b) depicted in FIG. 4 may be defined using the method depicted in the flowchart of FIG. 5. The sub-regions (402a, 402b) may also be defined using similar or equivalent methods to that depicted in FIG. 5. The sub-regions (402a, 402b) depicted in FIG. 4 are rectangular, and each have an associated middle-point/centre-point (404a, 404b). In FIG. 4, the sub-regions are smaller nearer the coast, which suggests that the vessel movement data associated with vessels travelling nearer the coast shows greater variance than the vessel movement data associated with vessels travelling in the open ocean.

FIG. 5 is a flowchart showing a possible method of defining, within the geographical region, sub-regions in which the vessel traffic data has similar characteristics.

At 500, the process starts with N proposed sub-regions, each labelled by T. The size and coverage of the initially proposed sub-regions may be arbitrarily chosen. In a preferred embodiment, the geographical region of interest is the globe/the Earth's surface, and the algorithm begins with two proposed sub-regions (i.e. N=2). The two initially proposed sub-regions cover all of the Earth's surface, are rectangular, and roughly represent the Eastern and the Western hemisphere respectively.

At 502, i is set equal to one. This sets up the algorithm to consider each of the proposed sub-regions in turn.

At 504, vessel traffic data associated with the 'i-th' sub-region is considered. Each MS message which was broadcast from a location within the boundary of the 'i-th' proposed sub-region is associated with the 'i-th' sub-region. In some implementations, every AIS message associated with the 'i-th' sub-region is considered. In some implementations, only a statistically significant sub-set of the AIS messages associated with the 'i-th' sub-region is considered.

At 506, it is determined whether the variation of the data associated with the 'i-th' sub-region is above a threshold variation value. As discussed above, the variation may be quantified using the variance or the standard deviation of the data. In a preferred embodiment, the variance within the vessel speed data is determined. In some implementations, the variance of a set of data points is calculated, the set of data points being the vessel speeds from each AIS message associated with the 'i-th' sub-region, and the calculated variance is compared to a threshold variance value.

Rather than, or in addition to, using the vessel speeds, other AIS data can be taken into account at this stage. For example, the variation in any data present in a typical AIS message can be considered and compared to a threshold variation value. For example, sub-regions may be defined based on variation in the 'current fuel usage' of the AIS messages. Using this threshold, sub-regions would be defined based on similarities in fuel usage across the vessels travelling through the geographical region. Multiple variation thresholds can be considered, for example a threshold for vessel speed variation may first be considered, and a different threshold for 'current fuel usage rate' may also be considered.

The threshold variation value may be set according to a desired performance of the final graph. The lower the threshold, the more sub-regions will be created, and the higher the resolution of the resulting graph. However, such a high resolution graph will give a slower query calculation speed. There is therefore a 'trade-off' between accuracy of route calculation and query speed which can be adjusted by altering the variation threshold value.

If the variation is above the threshold value, then the process continues to 508. If the variation of data within the 'i-th' sub-region meets the threshold requirements, e.g. if the variation is equal to or below the variation threshold, the process continue to 510.

At 508, the 'i-th' proposed sub-region is divided into a plurality of smaller proposed sub-regions. This can be done in a number of ways, for example by dividing into an arbitrarily chosen number of smaller sub-regions. In a preferred embodiment in which the proposed sub-regions are rectangular, the 'i-th' proposed sub-region is split into four smaller, equally sized proposed sub-regions. In other words, the 'i-th' sub-region is divided into four quadrants.

At 510, the process determines whether i=N. This step determines whether all the proposed sub-regions of the N sub-regions have been processed yet. If i does not equal N, the process continues to 512 and i is incrementally increased, for example by 1. Once all the proposed sub-regions have been processed, I will equal N and the process continues to 514.

At 514, it is determined whether any sub-regions were divided when progressing from i=1 to i=N. This step can also be thought of as determining whether any new sub-regions were created when progressing from i=1 to i=N. If new sub-regions were created, the process continues to 516.

At 516, a new set of proposed sub-regions is formed, which is formed of each of the newly created sub-regions. The value of 'N' is set as equal to the total number of newly created sub-regions, and the new set of sub-regions is labelled using i. The process then begins again with the new set of proposed sub-regions.

The process continues until every proposed sub-region passes the test at 506, i.e. until it is possible to define a set of sub-regions in which data variation in each sub-region is below a threshold value. Thus, a set of sub-regions are defined within the geographical region in which the vessel traffic data has similar characteristics.

Given this disclosure, the skilled person would be able to produce an algorithm capable of carrying out the process detailed in FIG. 5. The skilled person will also recognise that other algorithms may be used to define suitable sub-regions within which the vessel traffic data has similar characteristics. For example, an algorithm may take an agglomerative rather than a divisive approach. Such an algorithm would start with a large number of small proposed sub-regions. The possibility of combining the nearest sub-region neighbours would be explored. Such an algorithm would iteratively combine neighbouring proposed sub-regions and, if the variation within the data associated with the neighbouring proposed sub-regions is below a variation threshold, the algorithm combines the sub-regions. The process continues until a combination of proposed sub-regions would result in a sub-region having associated data with a variation above the threshold, at which point the algorithm does not combine the neighbouring sub-regions. This process continues iteratively until the largest possible sub-regions are defined in which the vessel traffic data has a variation below the threshold value.

Figure 6:
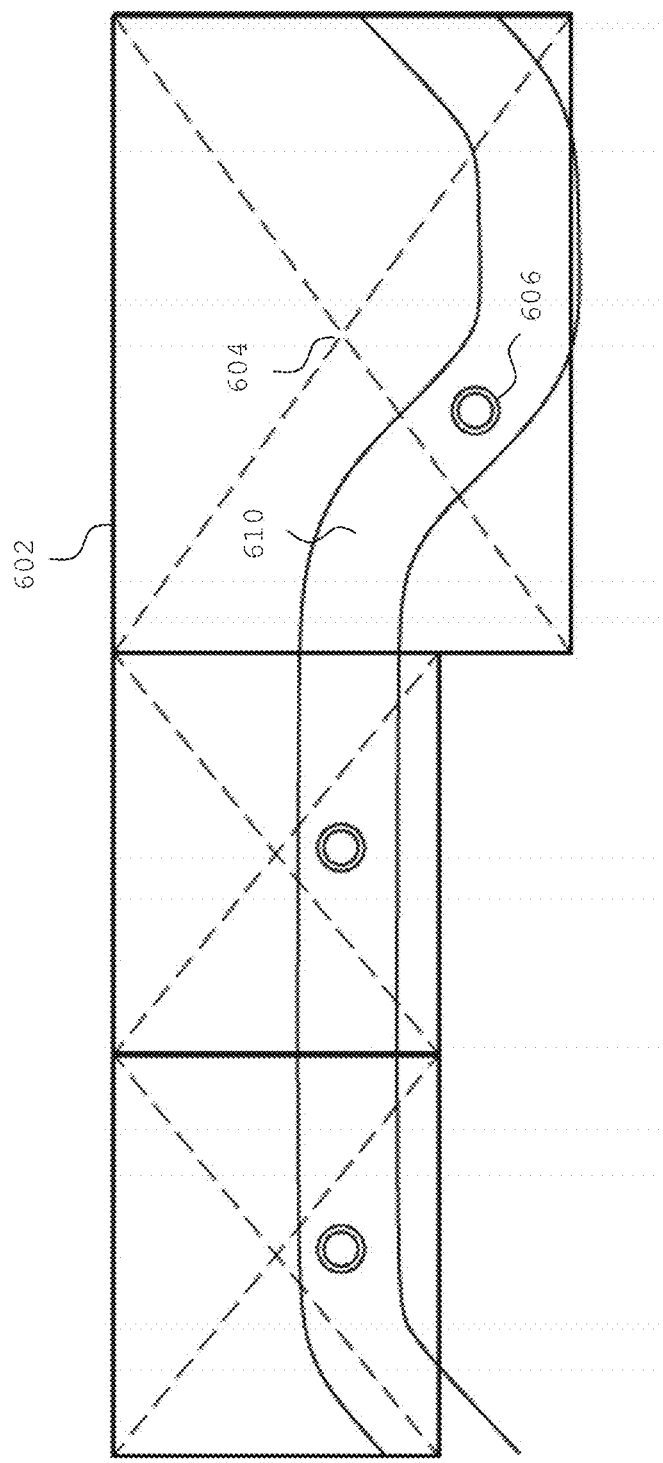
FIG. 6 depicts assigning nodes to identified sub-regions.

FIG. 6 depicts assigning nodes to identified sub-regions. FIG. 6 shows a defined sub-region 602 overlaid on a map showing the relevant part of the geographical region. The geographical region contains a river 610. The sub-region 602 is rectangular and has a centre-point 604. However, it will be appreciated that the centre-point 604 is located on land, i.e. at a geographical point which is not navigable by a vessel.

In some embodiments, steps are taken to ensure none of the nodes are associated with a location on land, or any other location which is known to be not navigable by a vessel. These additional steps may form part of step 306 of the flowchart of FIG. 3. The centre-point 604 of a sub-region 602 may be associated with a location on land when, for example, the sub-region 602 contains both a navigable river 610 or canal and the land which surrounds it. To prevent a node being associated with a non-navigable geographical location, the sub-region centre-point locations are compared with the locations of known land masses before the nodes are assigned. If the sub-region centre-point falls on land, the node is assigned to a navigable body of water which is nearest to the sub-region centre. This ensures smooth and efficient routes may be determined even for geographical regions which contain canals.

This 'snapping' of nodes to the closest navigable body of water is depicted in FIG. 6. Consider sub-region 602. Sub-region 602 has been defined using AIS messages broadcast by vessels travelling along the region of the river incorporated inside sub-region 602. Rather than assigning a node on the graph to a location associated with centre-point 604, the node 606 is instead associated with the closest known navigable point of water to centre-point 604.

It will be understood that the above description of specific implementations and arrangements is by way of example only and is not intended to limit the scope of the present disclosure. Many modifications of the described embodiments, some of which are now described, are envisaged and intended to be within the scope of the present disclosure.

With reference to step 308 of FIG. 3, while considering the nearest neighbouring sub-regions has been primarily discussed herein, it will be appreciated that in some implementations it is not only the nearest neighbouring nodes which are considered when joining nodes with edges. The neighbours of each of the neighbouring nodes may also be considered. In these implementations, more journeys are identified, including those journeys which traverse through sub-regions which are not necessarily contiguous. Such an approach leads to a graph having much more information and many more edges which link the nodes.

In some implementations, additional steps are taken at steps 308 and/or 310 of FIG. 3, or in between these steps. For example, following step 308 as described above, it is possible that a discontinuous graph has been formed. In other words, a graph has been formed in which it is not possible to traverse from each node to every other node. If isolated regions of the graph are formed after step 308, such isolated areas of the graph may be identified and joined together to ensure a continuous network within the geographical region. For example, isolated regions may form in internal canal systems, and/or in navigable bodies of water which are inland such as a lake. These isolated regions are formed because no vessel journeys have been identified between the geographical regions they represent.

In an example, twenty different isolated regions of the graph may be present following step 308. These isolated regions are identified, and the nearest nodes between adjacent isolated regions are identified. These nodes are joined, but with a relatively high weight edge. This high weight edge represents the possibility of travel between the isolated regions, but ensures that travel along this edge is strongly discouraged. Each isolated region is joined in this way to ensure a continuous graph, but which has regions which are linked by very high weight edges to discourage travel between these regions.

In some implementations, 'shortcuts' may be identified to allow traversal of multiple nodes in fewer steps. Shortcuts are edges linking nodes which are not nearest neighbours, i.e. which are not adjacent. Creating these shortcuts reduces calculation speed when the graph is queried, and the resulting graph containing the shortcuts allows optimal routes to be determined which appear less 'jerky' and 'jagged', i.e. which appear smoother when plotted in a manner similar to the routes depicted in FIG. 2.

Shortcuts may be determined, for example, in step 308 and/or step 310 shown in FIG. 3, between these two steps, or in processing steps carried out once the process of FIG. 3 has been carried out. As detailed above, initial calculations link adjacent nodes using the vessel traffic data. Shortcuts can then be created across two or three adjacent nodes. In some implementations, for each node, the neighbouring nodes and the neighbours of those neighbouring nodes are considered. Considering a first node, an intermediate node which is adjacent to the first node, and a second node which is adjacent to the intermediate node but not adjacent to the first node, a 'shortcut', i.e. a new edge, is created between the first and second node provided that there is an edge between both the first node and the intermediate node and between the intermediate node and the second node. In some implementations there is an extra condition: a shortcut is created provided there is no land mass present in any of the sub-regions associated with the first, intermediate, or the second nodes. In other words, a shortcut is created provided there is clear water between the first and the second node. The weight of the newly created shortcut edge may be found by simply adding the weight of the edge which linked the first node and the intermediate node to the weight of the edge which linked the intermediate node and the second node.

In some implementations, the weights assigned to edges may be blended weights, the blended weights being a blend of different weights calculated using the methods described above, or a blend of weights obtained using the methods disclosed herein and other factors. Blended weights may be based on at least two respective types of vessel journey characteristic identified using the vessel traffic data. A vessel journey characteristic may comprise any characteristics discussed herein or otherwise derivable from vessel traffic data, e.g. the average time taken to complete the journey, the average speed during the journey, the average amount of fuel used during the journey, etc., and may include characteristics of the vessel itself, for example weight of the vessel, vessel type, and cargo type. A blended weight can be calculated as a weighted average, e.g. as follows:

$$w_b = I_1 w_1 + I_2 w_2 + \ldots I_N w_N$$

where $w_b$ is the blended weight for a particular edge, $I_1$ and $I_2$ are influence values, and $w_1$ and $w_2$ are weights determined using the actual vessel journeys associated with the edge, as discussed above. The influence values describe how much influence a particular weight has on the blended weight. The influence values add up to 1, and can be thought of as percentages. An arbitrary number 'N' of weights can be incorporated into a blended weight.

In an example, a blended weight incorporates a weight $w_1$ associated with the average time taken to travel along an edge, a weight $w_2$ associated with the average fuel consumption of vessels travelling along the edge, and a weight $w_3$ associated with the amount of journeys which were identified along the edge. Such a blended weight may be calculated for each edge of the graph. In some embodiments, before determining an optimal route, the user can determine how 'influential' each of these factors should be on the route by adjusting the values of the influence factors. Using the above example, a user wishing to get to their destination as quickly as possible with no regard for fuel usage may set $I_2$ to zero. A user wishing to ensure their route is 'well-traveled' and thus safe would increase the influence of $w_3$.

In another example, a blended weight may incorporate the degree of vessel traffic and the average time taken to travel between nodes in order to allow the determination of a quick route which sticks to commonly traveled shipping routes. It will therefore be appreciated that the blended weights may incorporate at least two weights determined using different respective types of vessel journey characteristic.

The blended weight may also incorporate weights and factors not determined using vessel traffic data. For example, for edges which pass through geographical regions containing land, the blended weight may incorporate a weight based on the ratio of navigable to non-navigable area in the sub-regions joined by the edge, or in surrounding sub-regions. Such a weight calculated based on the amount of non-navigable areas (such as land) in surrounding sub-regions, means that the resulting blended weight is increased for edges which pass near land. This has the effect of discouraging travel along these routes, i.e. to discourage 'land-hugging'. Similarly, edges which pass through regions associated with piracy may be increased using a blended weight in order to discourage travel along these regions.

In some implementations, live data may also be incorporated into the representation/graph. For example, current weather conditions and/or tidal information can be incorporated into the weighting of the edges. This is useful in situations where a type of weather or other meteorological phenomena, for example a storm, is known to be heading in a certain direction. The direction and speed of travel of a storm or another type of weather pattern can be determined using known computer modelling techniques. Using a blended weight which incorporates meteorological information and/or tidal information means that vessels may be discouraged from travelling along routes along which the vessel is likely to pass into the storm.

Also, the graph may be regularly updated, and/or re-calculated, using up-to-date MS data. For example, the graph may be calculated using AIS messages broadcast in the geographical region over a three month period. To ensure the graph is kept up-to-date, the graph is re-calculated every month with the latest month's data included in the three-month. It will be appreciated that re-calculation of the graph may occur regularly over any time period, for example every day or every week. This ensures that the optima routes which are calculated are based on up-to-date vessel traffic data.

Given the extensive nature of the AIS data, it will be appreciated that multiple graphs, nodes, edges and weights may be generated depending on a variety of factors, for example vessel type. For example, it will be appreciated that tankers typically travel along routes different to those traveled along by fishing vessels due to their size and weight. Thus, vessel data can be incorporated when producing the graph such that different edges and weights are produced depending on, for example, vessel type, cargo, or weight. In some embodiments, AIS messages associated with vessels above a certain weight or size threshold, below a certain weight or size threshold, or within a certain size/weight range, can be extracted from the data.

For example, steps 308, 310 and 312 of FIG. 3 may include assigning multiple edges between nodes. For example, different groups of journeys between a first and a second node may be identified, each group of journeys being associated with a different vessel type or vessel characteristic. For example, a group of journeys between the nodes associated with fishing vessels is identified, a group of journeys associated with cargo ships is identified, and a group of journeys associated with tankers is identified. These groups of journeys may be analysed, and three different edges, with different associated weights, may be produced in order to link the two nodes. For example, each different group may have different average speeds and/or different average fuel consumptions, according to the vessel type/characteristic in question. The average fuel consumption of journeys associated with tankers between the two nodes will be larger than the average fuel consumption of journeys associated with fishing vessels.

In this manner, the representation/graph may incorporate different nodes and edges according to vessel type and/or characteristic. In some implementations, when an optimal route is to be calculated, a user enters information relating to their vessel type. When calculating the optimal route, a graph is used having edges and weights relevant to the user's vessel type. In other words, the graph may comprise a plurality of edges between a first and a second node, each of the plurality of edges being calculated/determined based on vessel traffic data relating to different vessel characteristics. Similarly, the graph may comprises edges which have been identified as being only suitable for travel by smaller vessels, e.g. an edge which links two nodes which are near a land mass, or those edges which are associated with travelling along a canal which has a vessel width restriction. These characteristics may include vessel size (height/width), weight, fuel consumption, average speed, or any other information relating to vessel characteristics which may be obtained from AIS messages. When determining the optimal route, the edges and weights are used which are most relevant to the user's vessel.

In this manner, a graph suitable for determining optimal routes for, for example, tankers may be produced. When producing a graph suitable for calculating an optimal route for a tanker, data is discounted which is associated with, for example, fishing vessels, which may travel closer to land masses than tankers. In this manner, a graph may be produced which is suitable for determining an optimal route for a particular vessel type. It will be appreciated that any data contained in a typical AIS message may be used in order to extract specific types of AIS messages, i.e. data points, to form the basis of the graph, and thus the optimal route may be tailored to a particular vessel.

In relation to step 310, in an alternative implementation only a single journey need be incorporated into the calculation when assigning a weight to an edge. In such an implementation, the AIS messages associated with the identified journey which have a location within the first geographical sub-region are considered, and the AIS message with a location nearest the first node is identified. Similarly, the AIS messages associated with the identified journey which have a location within the second geographical sub-region are considered, and the AIS message with a location nearest the second node is identified. By considering these two respective AIS messages, it is possible to assign a value to the edge which is associated with the time taken by the particular vessel to travel between the first and the second node.

While reference has been made herein to the term 'graph', as the graph represents the geographical region the graph may also be referred to as a representation, or a graphical representation. Similarly, while the term 'node' has primarily been used herein, a node may also be referred to as an apex, a vertex, a point of interest, or a a junction. While the term 'edge' has been used herein, edges may also be referred to as paths, arcs or lines.

The methods and approaches described herein may be embodied on a computer-readable medium, which may be a non-transitory computer-readable medium. The computer-readable medium carrying computer-readable instructions arranged for execution upon a processor so as to make the processor carry out any or all of the methods described herein.

The term "computer-readable medium" as used herein refers to any medium that stores data and/or instructions for causing a processor to operate in a specific manner. Such storage medium may comprise non-volatile media and/or volatile media. Non-volatile media may include, for example, optical or magnetic disks. Volatile media may include dynamic memory. Exemplary forms of storage medium include, a floppy disk, a flexible disk, a hard disk, a solid state drive, a magnetic tape, or any other magnetic data storage medium, a CD-ROM, any other optical data storage medium, any physical medium with one or more patterns of holes, a RAM, a PROM, an EPROM, a FLASH-EPROM, NVRAM, and any other memory chip or cartridge.

Unless specifically stated otherwise, as apparent from the following discussion, it is appreciated that throughout the description, discussions utilizing terms such as "receiving", "determining", "comparing", "identifying," or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The above implementations and arrangements have been described by way of example only, and the described implementations and arrangements are to be considered in all respects only as illustrative and not restrictive. It will be appreciated that variations of the described implementations and arrangements may be made without departing from the scope of the invention.

The invention claimed is:

1. A computer-implemented method of determining an optimal route for a first vessel based on current vessel traffic data, the first vessel being of a first type and/or having first characteristics, the method comprising:
   electronically receiving current vessel traffic data relating to a movement of each of a plurality of vessels in a geographical region;
   electronically defining sub-regions within the geographical region in which the current vessel traffic data has similar characteristics, wherein defining sub-regions within the geographical region in which the current vessel traffic data has similar characteristics comprises identifying regions in which variation within vessel speed data is below a threshold value;
   electronically producing a representation of the geographical region, the representation comprising nodes joined by edges, each node being associated with a respective defined sub-region, wherein at least a first node and a second node are joined by a plurality of edges, each edge of the plurality of edges being created using a different group of vessel journeys identified using the current vessel traffic data, each group of vessel journeys being associated with a different vessel type or vessel characteristic; and
   electronically determining the optimal route for the first vessel between two geographical points using the representation of the geographical region and the first type and/or the first characteristics of the first vessel.

2. The computer-implemented method of claim 1, further comprising electronically assigning nodes to the representation.

3. The computer-implemented method of claim 1, further comprising electronically joining neighbouring nodes in the representation with the edges based on vessel journeys identified using the vessel traffic data.

4. The computer-implemented method of claim 1, wherein the nodes are connected by edges each having at least one associated weight, the weights being based on characteristics of vessel journeys identified using the vessel traffic data.

5. The computer-implemented method of claim 4, the at least one associated weight being representative of at least one of: an average time taken to travel along the edge; an average amount of fuel required to travel along the edge; an average amount of monetary cost required to travel along the edge; and a number of journeys identified along the edge in the vessel traffic data.

6. The computer-implemented method of claim 4, wherein the weights are blended weights, wherein each blended weight is based on at least two respective types of vessel journey identified in the vessel traffic data, the types of vessel journey being associated with different vessel characteristics.

7. The computer-implemented method of claim 1, wherein the optimal route is determined using a shortest-path routing algorithm.

8. The computer-implemented method of claim 1, further comprising iteratively considering each of a number of proposed sub-regions and, for each proposed sub-region:
electronically determining whether the variation within vessel speed data associated with the proposed sub-region is above the threshold value and, if it is, splitting the proposed subregion into a plurality of smaller proposed sub-regions.

9. The computer-implemented method of claim 8, wherein the sub-regions in which the vessel traffic data has similar characteristics are defined as those proposed sub-regions in which variation within vessel speed data is not above the threshold value.

10. The computer-implemented method of claim 1, wherein the vessel traffic data comprises data relating to speeds of each of the plurality of vessels.

11. A computer-implemented method of producing a representation of a geographical region for use in determining, based on current vessel traffic data, an optimal route for a first vessel between two geographical points, the first vessel being of a first type and/or having first characteristics, the method comprising:
electronically receiving the current vessel traffic data relating to movement of each of a plurality of vessels in the geographical region;
electronically defining sub-regions within the geographical region in which the current vessel traffic data has similar characteristics, wherein defining sub-regions within the geographical region in which the current vessel traffic data has similar characteristics comprises identifying regions in which variation within vessel speed data is below a threshold value; and
electronically producing the representation of the geographical region, the representation comprising nodes joined by edges, each node being associated with a respective defined sub-region, wherein at least a first node and a second node are joined by a plurality of edges, each edge of the plurality of edges being created using a different group of vessel journeys identified using the current vessel traffic data, each group of vessel journeys being associated with a different vessel type or vessel characteristic.

12. A non-transitory computer readable medium comprising computer-executable instructions which, when executed by a processor, cause the processor to perform a method of producing a representation of a geographical region for use in determining, based on current vessel traffic data, an optimal route for a first vessel between two geographical points, the first vessel being of a first type and/or having first characteristics, the method comprising:
electronically receiving the current vessel traffic data relating to movement of each of a plurality of vessels in the geographical region;
electronically defining sub-regions within the geographical region in which the current vessel traffic data has similar characteristics, wherein defining sub-regions within the geographical region in which the current vessel traffic data has similar characteristics comprises identifying regions in which variation within vessel speed data is below a threshold value; and
electronically producing the representation of the geographical region, the representation comprising nodes joined by edges, each node being associated with a respective defined sub-region, wherein at least a first node and a second node are joined by a plurality of edges, each edge of the plurality of edges being created using a different group of vessel journeys identified using the current vessel traffic data, each group of vessel journeys being associated with a different vessel type or vessel characteristic.

13. The non-transitory computer readable medium of claim 12, wherein the computer readable medium further comprises computer executable instructions which, when executed by the processor, cause the processor to electronically determine an optimal route for the vessel between the two geographical points using the representation of the geographical region.

* * * * *